(12) United States Patent
Gotou

(10) Patent No.: US 9,685,777 B2
(45) Date of Patent: Jun. 20, 2017

(54) LEAKAGE DETECTION BREAKER

(71) Applicant: Panasonic Corporation, Osaka (JP)

(72) Inventor: Kiyoshi Gotou, Hyogo (JP)

(73) Assignee: Panasonic Corporation, Osaka (JP)

(*) Notice: Subject to any disclaimer, the term of this patent is extended or adjusted under 35 U.S.C. 154(b) by 388 days.

(21) Appl. No.: 13/845,239

(22) Filed: Mar. 18, 2013

(65) Prior Publication Data
US 2013/0215538 A1 Aug. 22, 2013

Related U.S. Application Data

(63) Continuation of application No. PCT/IB2011/002939, filed on Dec. 6, 2011.

(30) Foreign Application Priority Data

Dec. 8, 2010 (JP) .................. 2010-273539

(51) Int. Cl.
H02H 3/00 (2006.01)
H02H 3/16 (2006.01)
H02H 3/33 (2006.01)

(52) U.S. Cl.
CPC ............... H02H 3/16 (2013.01); H02H 3/33 (2013.01)

(58) Field of Classification Search
USPC .......................................... 361/42
See application file for complete search history.

(56) References Cited

U.S. PATENT DOCUMENTS

| 6,593,767 B1* | 7/2003 | Tanaka et al. ........... 324/765.01 |
| 8,422,182 B2* | 4/2013 | Boudet et al. .............. 361/91.1 |
| 2003/0112015 A1 | 6/2003 | Takakamo et al. |
| 2010/0194354 A1* | 8/2010 | Gotou .................. B60L 3/003 320/163 |
| 2011/0110003 A1* | 5/2011 | Goto ....................... H02H 3/33 361/42 |
| 2013/0215538 A1* | 8/2013 | Gotou .................... H02H 3/16 361/42 |

FOREIGN PATENT DOCUMENTS

| CN | 101534000 | 1/2010 |
| EP | 2 309 633 | 4/2011 |
| JP | S63-000917 | 1/1988 |
| JP | H06-118111 | 4/1994 |

(Continued)

OTHER PUBLICATIONS

Japanese Office Action dated Jul. 1, 2014 issued in a corresponding Japanese Application No. 2010-273539 and the English summary thereof.

(Continued)

Primary Examiner — Ronald W Leja
(74) Attorney, Agent, or Firm — Renner, Otto, Boisselle & Sklar, LLP.

(57) ABSTRACT

A leakage detection breaker includes a current transformer configured to detect a leakage current, and a leakage determination unit configured to determine DC and AC leakages based on an output signal from the current transformer. The leakage detection breaker further includes a power supply cut-off unit configured to cut off a supply of DC or AC power when the current leakage determination unit determines the occurrence of the DC or AC leakage.

11 Claims, 19 Drawing Sheets

(56) References Cited

FOREIGN PATENT DOCUMENTS

| | | |
|---|---|---|
| JP | H10-191552 | 7/1998 |
| JP | 2000-002738 | 1/2000 |
| JP | 2000-270463 | 9/2000 |
| JP | 2006-060275 | 3/2006 |
| JP | 2007-110844 | 4/2007 |
| JP | 2010-15745 | 1/2010 |
| TW | 517420 | 11/1989 |
| TW | I221914 | 9/1991 |
| WO | 2010/010711 | 1/2010 |
| WO | WO 2010001950 A1 * | 1/2010 |

OTHER PUBLICATIONS

Taiwanese Office Action dated Dec. 26, 2013 and the English translation of the Search Report of the Taiwanese Office Action for corresponding Taiwanese Application No. 100145179.

International Search Report for corresponding International Application No. PCT/IB2011/002939 maield Mar. 27, 2012.

Chinese Office Action dated Oct. 28, 2014 issued in corresponding Chinese application No. 201180058376.2 and English translation of search report.

* cited by examiner

LEAKAGE DETECTION BREAKER

This application is a Continuation Application of PCT International Application No. PCT/IB2011/002939 filed on Dec. 6, 2011, which designated the United States.

FIELD OF THE INVENTION

The present invention relates to a leakage detection breaker for protecting a human body or the like by detecting AC and DC leakages and cutting off the supply of AC and DC power to a load.

BACKGROUND OF THE INVENTION

Conventionally, a technique for detecting AC and DC leakage and cutting off the supply of AC power to an electrical storage unit has been known (e.g., see Japanese Patent Application Publication No. JP2000-270463A).

Recently, as environmental awareness is raised and photovoltaic power generation is distributed, techniques for supplying a load, such as a battery of a hybrid vehicle, with DC power generated by a solar panel (a photovoltaic power generation apparatus) are studied. The configuration for supplying such DC power is provided in addition to the configuration for supplying AC power from a conventional commercial AC power supply, to selectively switch to a DC power or an AC power depending on a connected load.

It is described in Paragraph [0020] of Japanese Patent Application Publication No. JP2000-270463A that if a ground fault occurs in the vicinity of the electrical storage unit (or on the DC power source side) of an electric vehicle through a human body, DC leakage current flows along the path of a positive electrode of the electrical storage unit, the human body, the earth, a return cable of a switching unit of a leakage breaker, and a negative electrode of the electrical storage unit. In this case, a DC leakage detection unit detects the DC leakage current, and the leakage breaker cuts off the supply of power by opening the switching unit based on the output of the detection.

However, when the electrical storage unit (battery) of the electric vehicle is used as a load and the technique disclosed in the JP2000-270463A is applied to the configuration in which the electrical storage unit is recharged with DC power generated by a solar panel, there is a problem as follows. That is, when DC current leaks in the path reaching the load from the solar panel, i.e., a DC power supply, it is impossible to detect the leakage and cut off the supply of DC power from the solar panel.

SUMMARY OF THE INVENTION

The present invention provides a leakage detection breaker for detecting current leakage occurring in a path connected to a DC power supply, as well as current leakage occurring in a path connected to an AC power supply, and cutting off the supply of power from the power supply in the path where the leakage occurs.

In accordance with an aspect of the invention, there is provided a leakage detection breaker including a current transformer configured to detect a leakage current; a leakage determination unit configured to determine DC and AC leakages based on an output signal from the current transformer; and a power supply cut-off unit configured to cut off a supply of DC or AC power when the current leakage determination unit determines the occurrence of the DC or AC leakage.

Preferably, the current transformer is configured to detect DC and AC leakage currents.

Preferably, the leakage detection breaker further includes an input voltage type determination unit configured to determine a type of voltage applied to a connected power line, wherein the leakage determination unit determines whether the DC leakage or the AC leakage occurs depending on the type of voltage determined by the input voltage type determination unit.

Preferably, the leakage determination unit determines whether the DC leakage or the AC leakage occurs based on a signal obtained by squaring an output signal from the current transformer.

Preferably, the leakage detection breaker further includes a display unit configured to display the type of voltage determined by the input voltage type determination unit when the current leakage determination unit determines the occurrence of the DC or AC leakage.

Preferably, the leakage detection breaker further includes an input voltage detection unit configured to detect AC input voltage, wherein the power supply cut-off unit cuts off the supply of AC power when the input voltage detection unit detects the input voltage equal to or higher than a predetermined voltage.

Preferably, the power supply cut-off unit comprises a bidirectional switching semiconductor device.

Preferably, the bidirectional switching semiconductor device comprises two unidirectional transistors reversely connected to each other in series.

Preferably, the bidirectional switching semiconductor device comprises a lateral bidirectional transistor having two control terminals.

Preferably, the power supply cut-off unit comprises a structure in which a lateral bidirectional transistor having two control terminals and a switching device having a contact are connected in series.

Preferably, the power supply cut-off unit comprises a structure in which a lateral bidirectional transistor having two control terminals and a switching device having a contact are connected in parallel.

In accordance with the leakage detection breaker of the present invention, the leakage determination unit determines DC and AC leakages based on an output signal from a current transformer, and then the power supply cut-off unit cuts off the supply of DC or AC power. Accordingly, by detecting current leakage occurring in the path connected to the DC power supply, as well as current leakage occurring in the path connected to the AC power supply, it is possible to cut off the supply of power from the power supply in the path where the leakage occurs.

BRIEF DESCRIPTION OF THE DRAWINGS

The objects and features of the present invention will be apparent from the following description of preferred embodiments given in conjunction with the accompanying drawings, in which:

FIG. 4 shows waveforms of output signals from respective parts, including a DC leakage determination unit and the like;

DETAILED DESCRIPTION OF THE EMBODIMENTS

Figure 1:
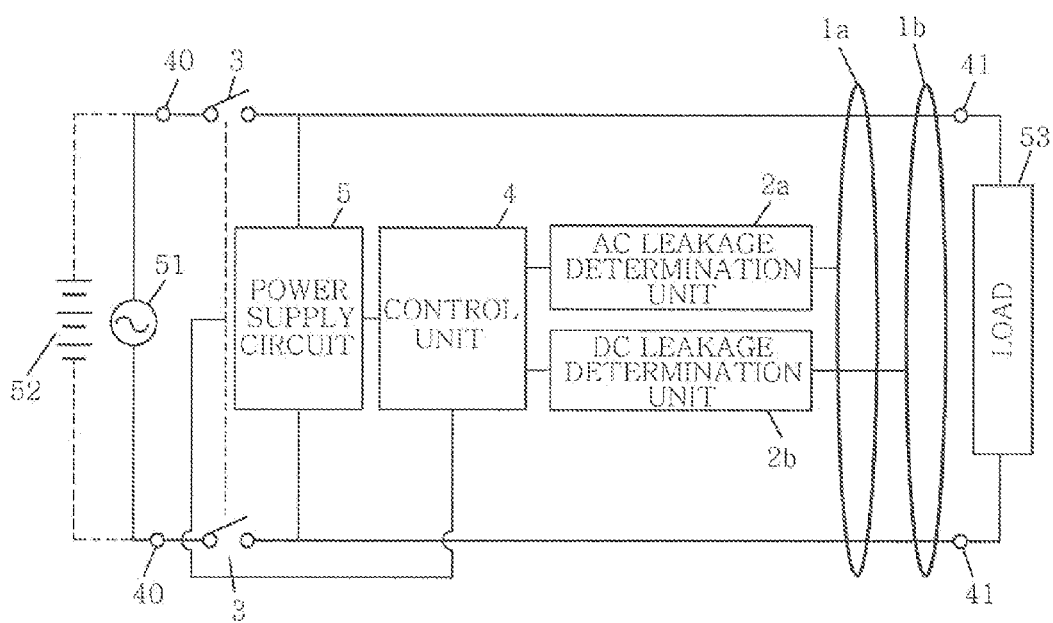
FIG. 1 is a circuit diagram schematically showing the configuration of a leakage detection breaker in accordance with one embodiment of the present invention.

Hereinafter, embodiments of the present invention will be described in detail with reference to the accompanying drawings which form a part hereof. Throughout the drawings, the same reference numerals are used to designate the same or similar elements and a redundant description thereof will be omitted.

A leakage detection breaker in accordance with one embodiment of the present invention will be described with reference to the drawings. FIG. 1 schematically shows the configuration of the leakage detection breaker. The leakage detection breaker includes an AC leakage current detection unit (current transformer) $1a$, a DC leakage current detection unit (current transformer) $1b$, an AC leakage determination unit $2a$, a DC leakage determination unit $2b$, power supply cut-off units 3, a control unit 4, a power supply circuit 5, input terminals 40, and output terminals 41. The leakage detection breaker is connected between a commercial AC power supply 51 and a load 53 or between a DC power supply 52 such as a solar panel and the load 53. The leakage detection breaker detects AC or DC leakage, and cuts off the power supplied to the load 53 from the commercial AC power supply 51 or the DC power supply 52.

The AC leakage current detection unit $1a$ detects AC leakage current and includes a zero-phase current transformer ZCT or the like. The DC leakage current detection unit $1b$ detects DC leakage current and includes a zero-phase current transformer ZCT or the like. The AC leakage determination unit $2a$ determines AC leakage based on an output signal from the AC leakage current detection unit $1a$. The DC leakage determination unit $2b$ determines DC leakage based on an output signal from the DC leakage current detection unit $1b$. The power supply cut-off units 3 cut off the power supplied to the load 53 from the commercial AC power supply 51 or the DC power supply 52 in accordance with a control signal from the control unit 4. An example of the power supply cut-off unit 3 is a relay having an electronically controlled mechanical contact.

The control unit 4 outputs a control signal to the power supply cut-off units 3 based on the output signals from the AC leakage determination unit $2a$ and the DC leakage determination unit $2b$. That is, if the AC leakage determination unit $2a$ determines that an AC leakage is occurring, the control unit 4 outputs a control signal to the power supply cut-off units 3 to cut off the power supplied to the load 53 from the commercial AC power supply 51. Also, if the DC leakage determination unit $2b$ determines that a DC leakage is occurring, the control unit 4 outputs a control signal to the power supply cut-off units 3 to cut off the power supplied to the load 53 from the DC power supply 52. The power supply circuit 5 supplies power to each part of the leakage detection breaker.

The commercial AC power supply 51 or the DC power supply 52 is connected to the input terminals 40. In FIG. 1, the commercial AC power supply 51 is connected as shown by a solid line. When the load 53 is a load using DC power, the DC power supply 52 is connected as shown by a dotted line. The load 53 is connected to the output terminals 41.

Figure 2:
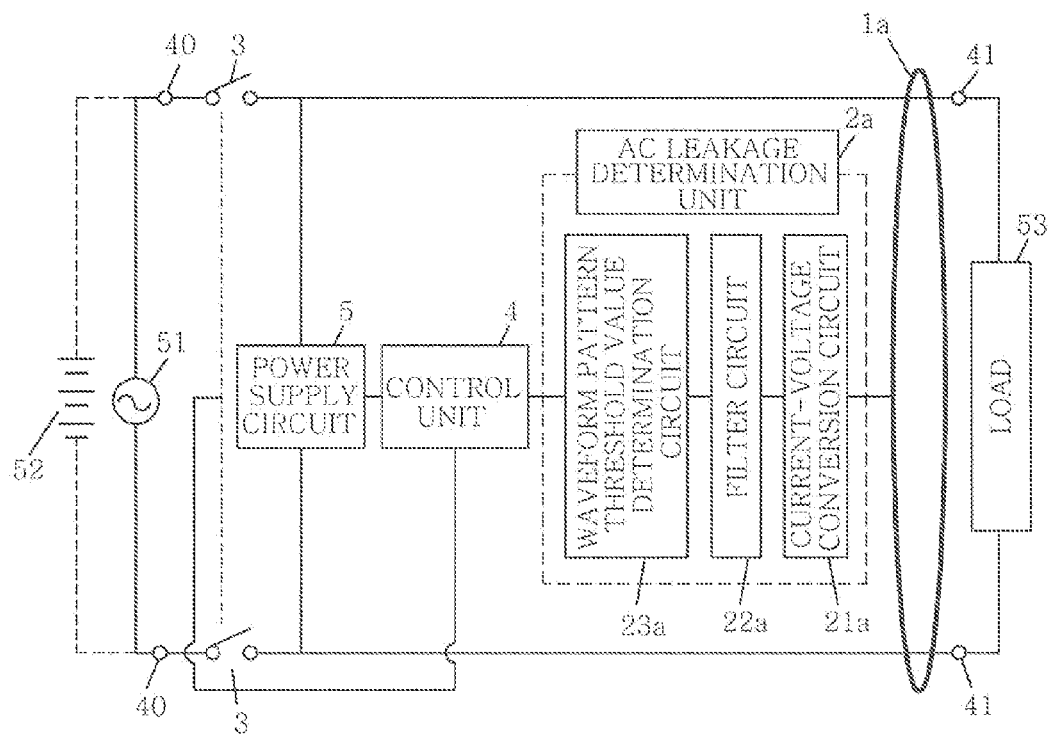
FIG. 2 is a circuit diagram showing the configuration for detecting and cutting off leakage, particularly AC, in a leakage detection breaker in accordance with one embodiment of the present invention.

FIG. 2 shows the configuration of the AC leakage determination unit $2a$ in the leakage detection breaker. The AC leakage determination unit $2a$ has a current-voltage conversion circuit $21a$, a filter circuit $22a$, a waveform pattern threshold value determination circuit $23a$, and the like. The current-voltage conversion circuit $21a$ converts a current signal outputted from the AC leakage current detection unit $1a$ into a voltage signal. The filter circuit $22a$ removes noise components of the voltage signal outputted from the current-voltage conversion circuit $21a$. The waveform pattern threshold value determination circuit $23a$ determines AC leakage, with reference to a threshold value, based on the waveform pattern of the voltage signal outputted from the filter circuit 22a.

For example, when positive and negative components of a voltage signal, which have an absolute value exceeding a predetermined threshold value, are alternately detected, it is determined that AC leakage occurs.

Figure 3:
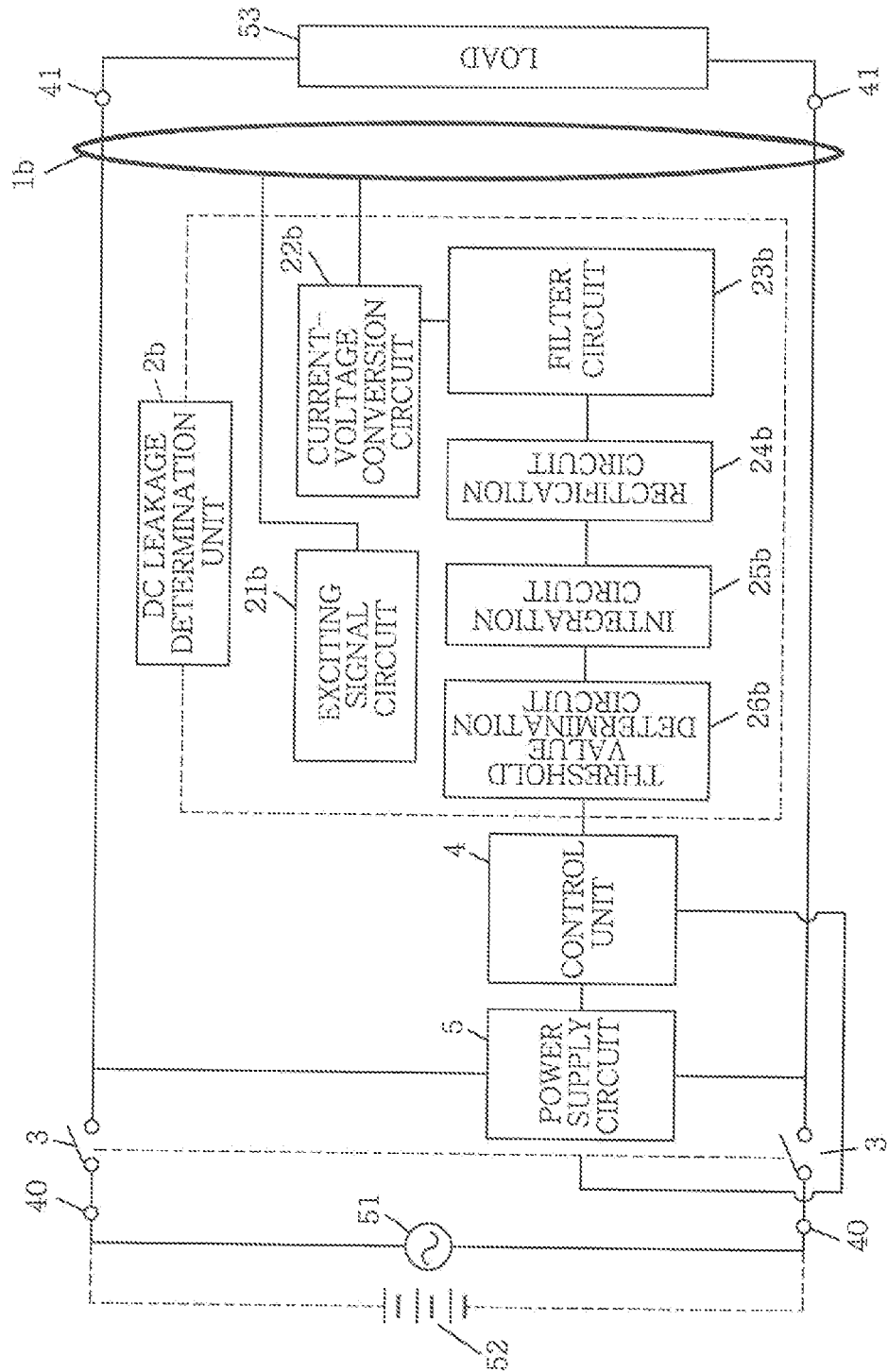
FIG. 3 is a circuit diagram showing a configuration for detecting and cutting off leakage, particularly DC, in a leakage detection breaker in accordance with one embodiment of the present invention.
Figure 4:
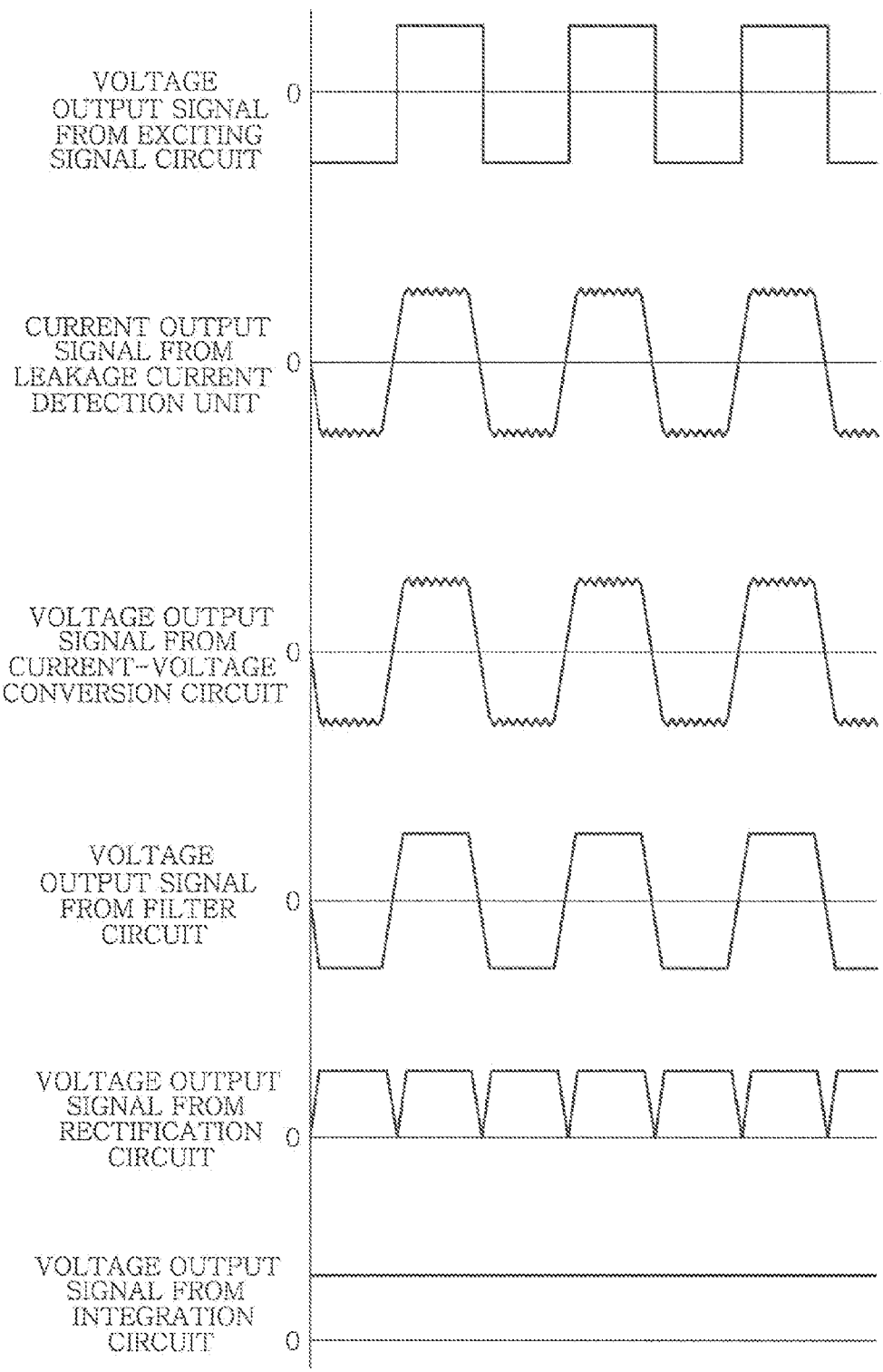

FIG. 3 shows the configuration of the DC leakage determination unit 2b in the leakage detection breaker. In addition, FIG. 4 shows waveforms of output signals from the respective parts of the DC leakage determination unit 2b and the DC leakage current detection unit 1b. The DC leakage determination unit 2b has an exciting signal circuit 21b, a current-voltage conversion circuit 22b, a filter circuit 23b, a rectification circuit 24b, a integration circuit 25b, a threshold value determination circuit 26b, and the like.

The exciting signal circuit 21b generates a pulse signal (voltage signal) to be inputted into the DC leakage current detection unit 1b. The DC leakage current detection unit 1b that has received the pulse signal, outputs a current signal shown in FIG. 4 to the current-voltage conversion circuit 22b. The current-voltage conversion circuit 22b converts the current signal from the DC leakage current detection unit 1b into a voltage signal. In this state, an output corresponding to an exciting current is obtained from the current-voltage conversion circuit 22b. The filter circuit 23b removes noise components of the voltage signal from the current-voltage conversion circuit 22b. The rectification circuit 24b rectifies the voltage signal from the filter circuit 23b. The integration circuit 25b smoothes the voltage signal from the rectification circuit 24b. That is, in a normal state, an output voltage corresponding to the exciting current is outputted from the integration circuit 25b as a smoothed voltage signal. If a leakage occurs in this state, the DC leakage current detection unit 1b changes the exciting state based on the leakage current, which results in change in the exciting current. In response to the change, the voltage output from the integration circuit 25b is also changed. That is, when the change width of the voltage signal from the integration circuit 25b is higher than a threshold value, it is determined that a DC leakage occurs, and when the change width of the voltage signal from the integration circuit 25b is equal to or lower than the threshold value, it is determined that no DC leakage occurs.

As described above, in accordance with the leakage detection breaker of this embodiment, the AC leakage determination unit 2a determines whether or not AC leakage occurs based on the output signal from the AC leakage current detection unit 1a, and then, the power supply cut-off units 3 cut off the power supplied to the load 53 from the commercial AC power supply 51. Also, the DC leakage determination unit 2b determines whether or not DC leakage occurs based on the output signal from the DC leakage current detection unit 1b, and then, the power supply cut-off units 3 cut off the power supplied to the load 53 from the DC power supply 52. Accordingly, the current leakage occurring in a path connected to the DC power supply 52, as well as the current leakage occurring in a path connected to the commercial AC power supply 51, can be detected, and thus, it is possible to cut off the supply of power from the power supply in the path where the leakage occurs.
(Modification)

Figure 5:
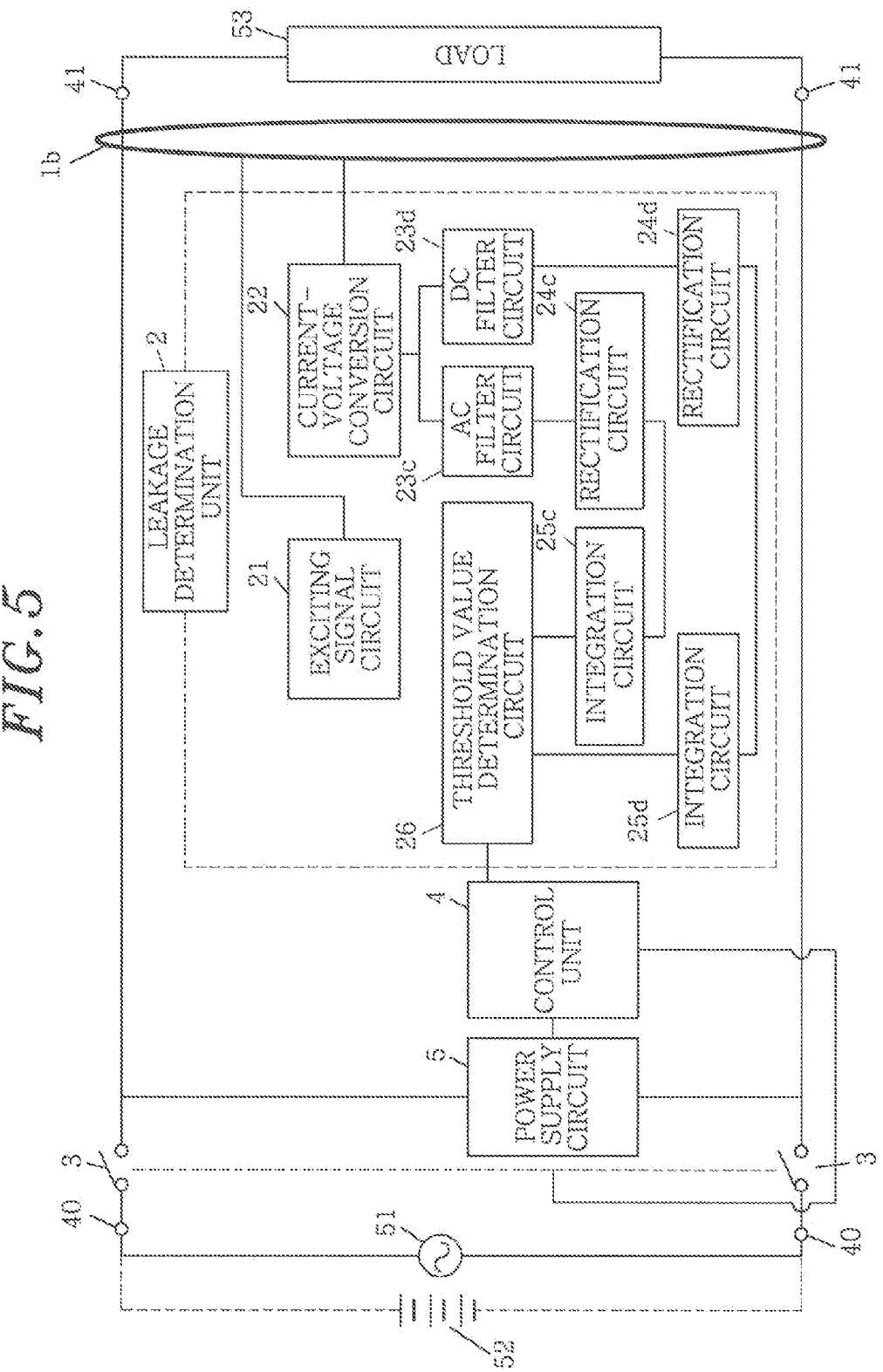
FIG. 5 is a circuit diagram schematically showing the configuration of a modification of the leakage detection breaker in accordance with the aforementioned embodiment.

FIG. 5 shows a modification of the leakage detection breaker in accordance with the aforementioned embodiment. In this modification, a single leakage current detection unit 1 detects DC and AC leakage currents and a single leakage determination unit 2 determines whether or not DC or AC leakages occur.

The leakage determination unit 2 has an exciting signal circuit 21, a current-voltage conversion circuit 22, an AC filter circuit 23c, a DC filter circuit 23d, an AC rectification circuit 24c, a DC rectification circuit 24d, an AC integration circuit 25c, a DC integration circuit 25d, a threshold value determination circuit 26, and the like. Among these, the configuration for determining whether or not DC leakage occurs, i.e., the exciting signal circuit 21, the current-voltage conversion circuit 22, the DC filter circuit 23d, the DC rectification circuit 24d, the DC integration circuit 25d and the threshold value determination circuit 26, and the operations thereof are the same as those of FIG. 4, and thus, the descriptions thereof will be omitted.

Figure 6:
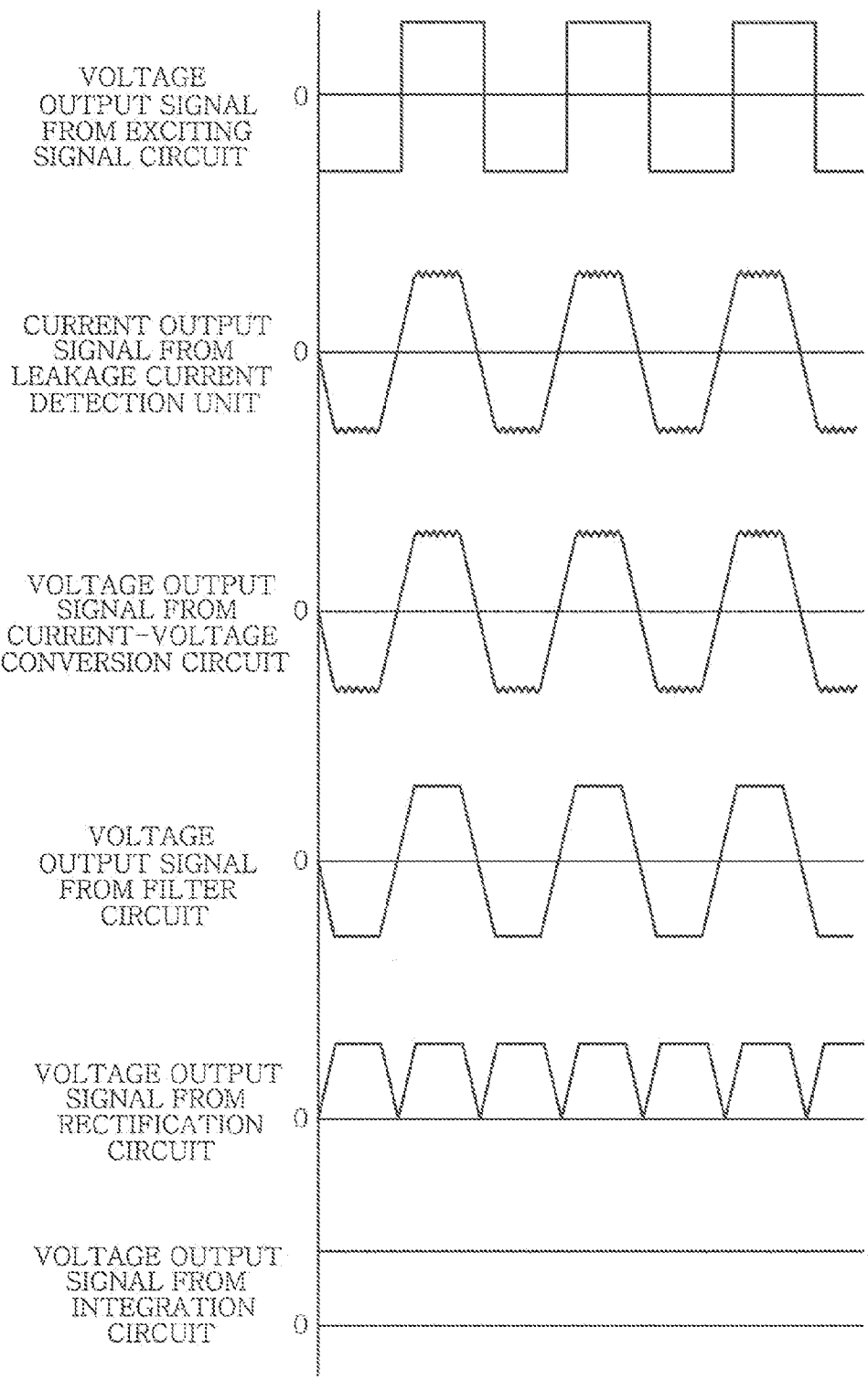
FIG. 6 shows waveforms of output signals from respective parts, including an AC leakage determination unit and the like, in the modification shown in FIG. 5.

FIG. 6 shows waveforms of output signals from the respective parts of the leakage determination unit 2 and the leakage current detection unit 1 in determining current leakage. In this modification, the exciting signal circuit 21 inputs a pulse signal into the leakage current detection unit 1 in determining AC leakage. Then, if a current signal is inputted into the current-voltage conversion circuit 22 from the leakage current detection unit 1, the current-voltage conversion circuit 22 converts the current signal into a voltage signal and outputs the voltage signal to the AC filter circuit 23c. The AC filter circuit 23c removes noise components of the voltage signal from the current-voltage conversion circuit 22. The AC rectification circuit 24c rectifies the voltage signal from the AC filter circuit 23c. The AC integration circuit 25c smoothes the voltage signal from the AC rectification circuit 24c. The threshold value determination circuit 26b compares the voltage signal from the AC integration circuit 25c with a predetermined threshold value and determines whether or not AC leakage occurs. That is, if the voltage signal input from the AC integration circuit 25c is higher than the threshold value, it is determined that AC leakage occurs, and if the voltage signal from the AC integration circuit 25c is equal to or lower than the threshold value, it is determined that no AC leakage occurs. Also, the determination of DC leakage is the same as that of FIG. 4, and thus, the descriptions thereof will be omitted.

In accordance with the leakage detection breaker of this modification, the single leakage current detection unit 1 detects DC and AC leakage currents, and the single leakage determination unit 2 determines DC and AC leakages. Thus, the apparatus can be simplified or manufactured at a low cost.
(Modification)

Figure 7:
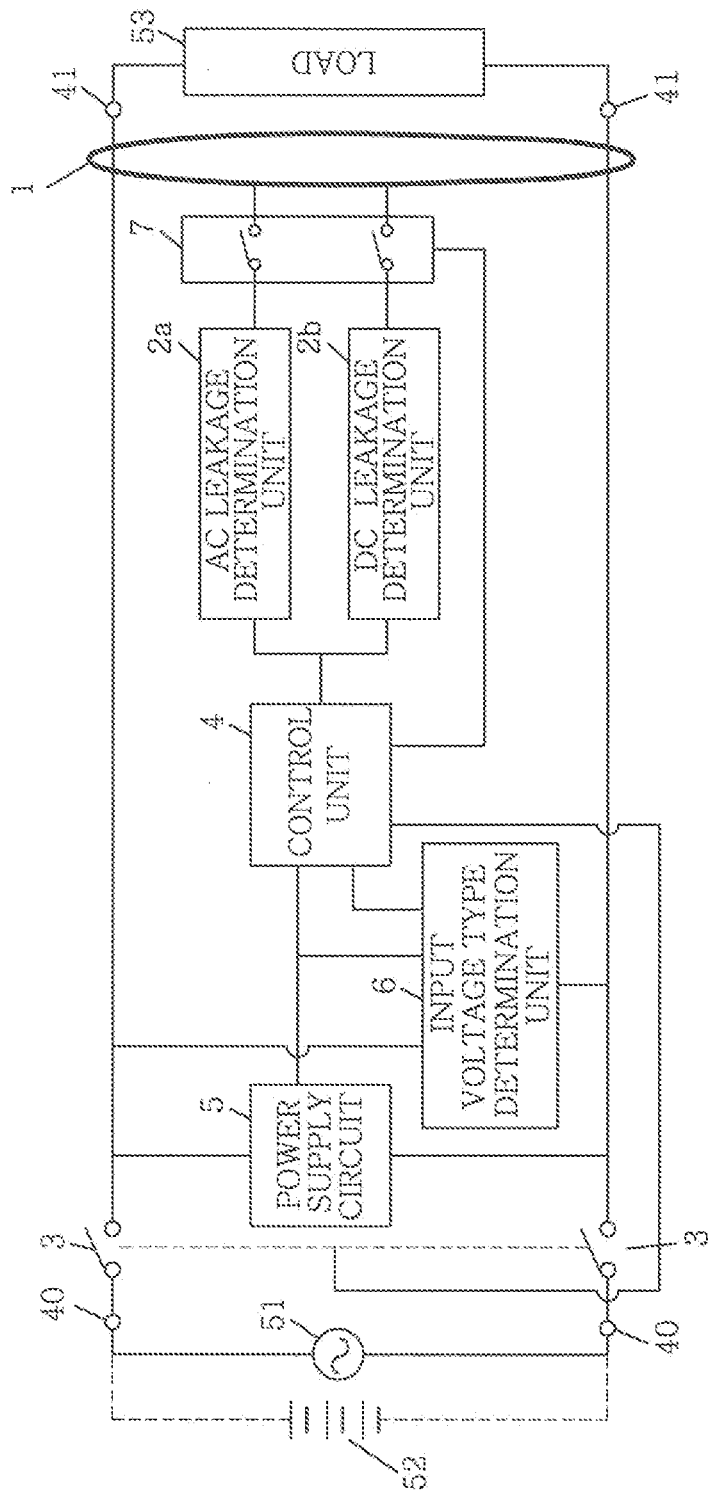
FIG. 7 is a circuit diagram schematically showing the configuration of another modification of the leakage detection breaker in accordance with the aforementioned embodiment.

FIG. 7 shows another modification of the leakage detection breaker in accordance with the aforementioned embodiment. In this modification, a single leakage current detection unit 1 detects DC and AC leakage currents, A type of voltage inputted into the leakage detection breaker is determined and the AC leakage determination unit 2a or the DC leakage determination unit 2b is selectively operated.

That is, the leakage detection breaker has an input voltage type determination unit 6 and a switching unit 7. The input voltage type determination unit 6 determines the type of voltage inputted into the leakage detection breaker (the type of voltage applied to the power line to which the load 53 is connected), then notifies the voltage type to the control unit 4. The control unit 4 outputs a control signal for controlling the switching unit 7 to the switching unit 7 based on the notification of the input voltage type determination unit 6. The switching unit 7 selectively switches over to the AC leakage determination unit 2a or the DC leakage determination unit 2b depending on the control signal from the control unit 4.

In accordance with the leakage detection breaker of this modification, since DC or AC leakage is determined by automatically switching over to the AC leakage determination unit 2a or the DC leakage determination unit 2b depending on the voltage applied to the power line to which the load 53 is connected, a time required for setting the leakage detection breaker can be reduced.

(Modification)

Figure 8:
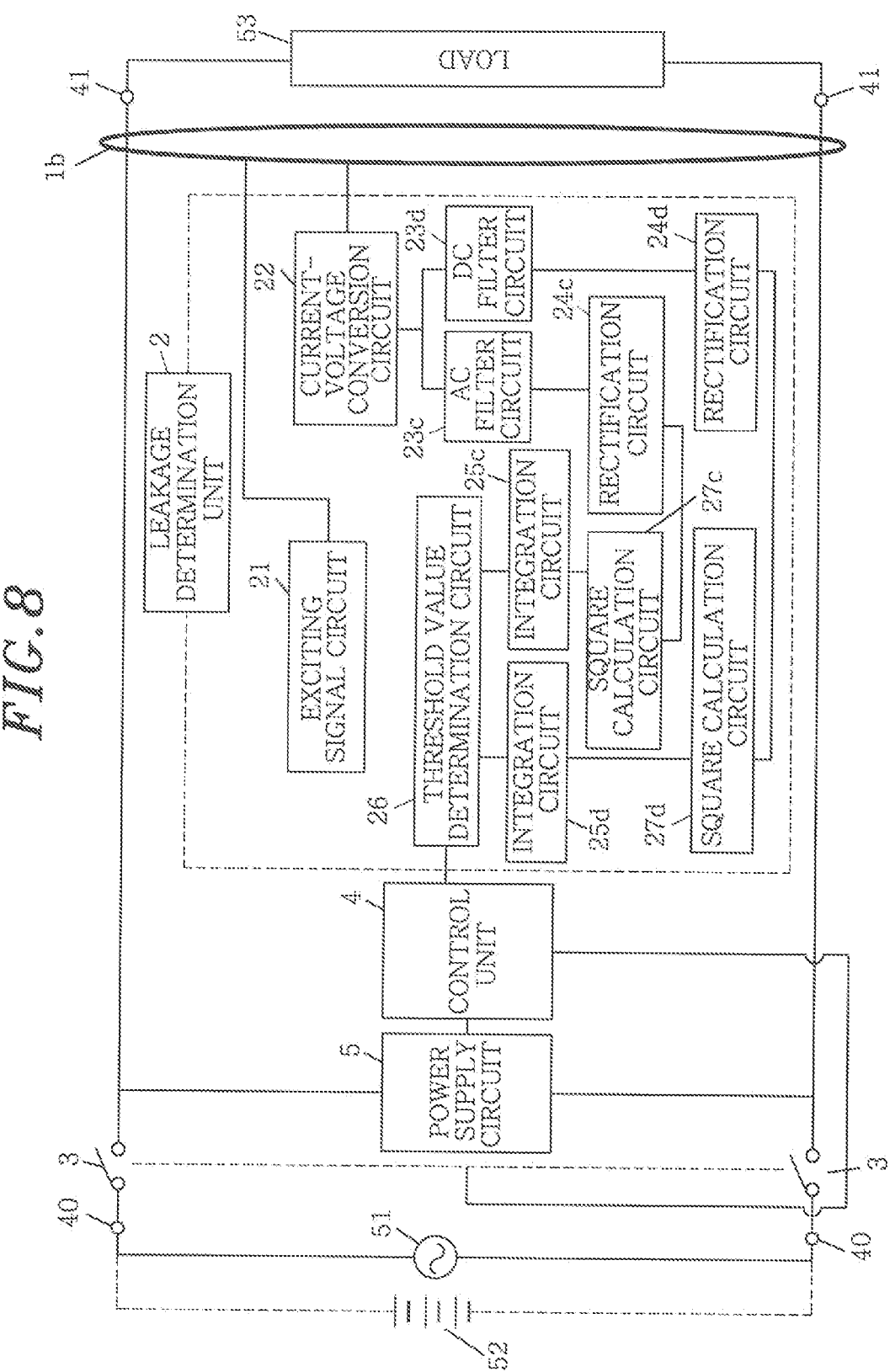
FIG. 8 is a circuit diagram schematically showing the configuration of still another modification of the leakage detection breaker in accordance with the aforementioned embodiment.

FIG. 8 shows still another modification of the leakage detection breaker in accordance with the aforementioned embodiment. In this modification, the leakage detection breaker further includes an AC square calculation circuit 27c between the AC rectification circuit 24c and the AC integration circuit 25c and a DC square calculation circuit 27d between the DC rectification circuit 24d and the DC integration circuit 25d.

Figure 9:
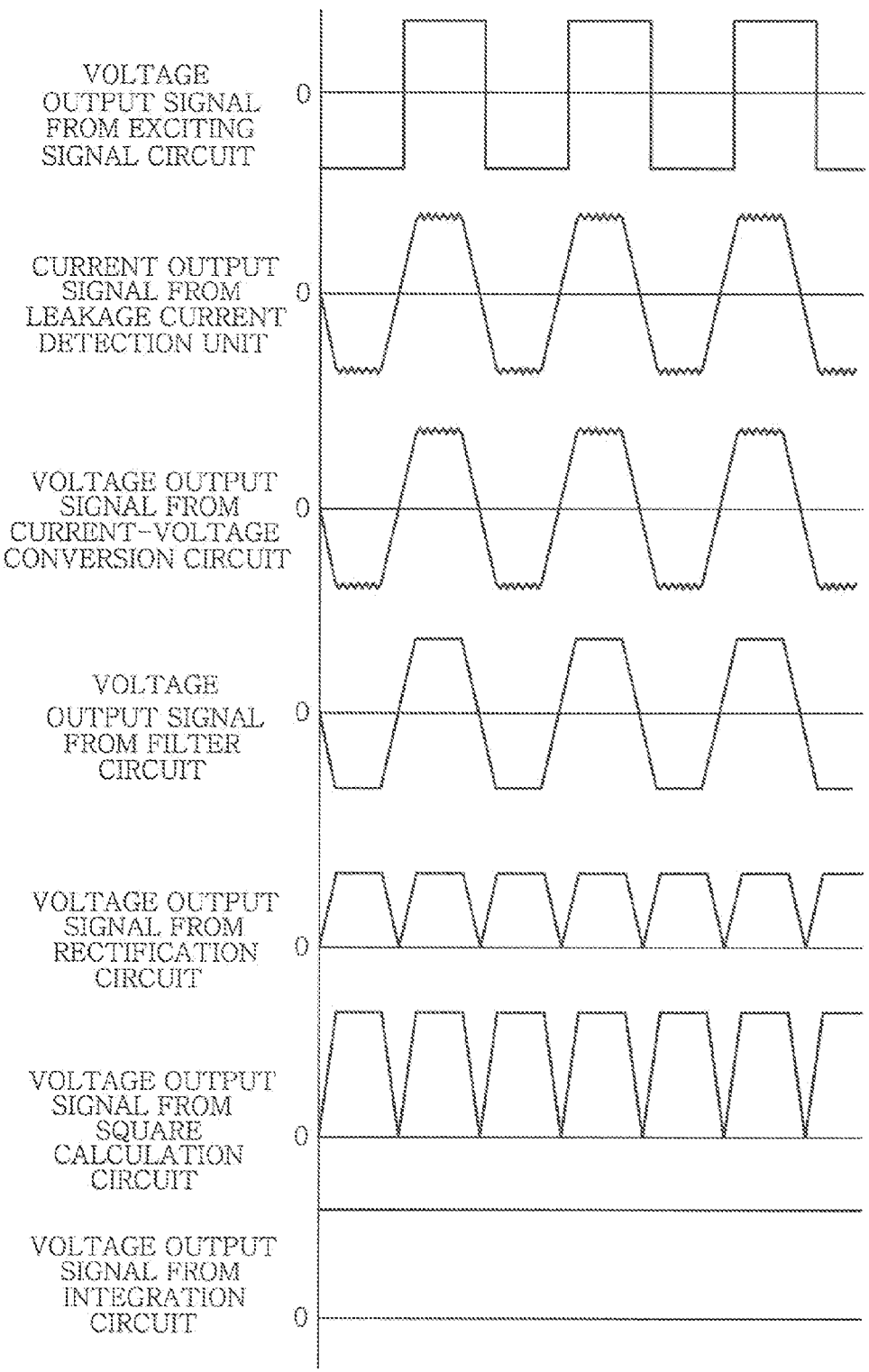
FIG. 9 shows waveforms of output signals from respective parts, including an AC leakage determination unit and the like, in the modification shown in FIG. 8.

FIG. 9 shows waveforms of output signals from the respective parts of the leakage determination unit 2 and the leakage current detection unit 1 in determining current leakage. The AC square calculation circuit 27c performs a square calculation on an output signal from the AC rectification circuit 24c and outputs it to the AC integration circuit 25c. In the same manner, the DC square calculation circuit 27d performs a square calculation on an output signal from the DC rectification circuit 24d and outputs it to the DC integration circuit 25d. Each of the AC square calculation circuit 27c and the DC square calculation circuit 27d calculates a physical quantity corresponding to the energy of the voltage signal by squaring the rectified voltage signal.

When the rectified voltage signal has a distortion, it is apprehended that if an integration operation is performed on the voltage signal as is accompanied by distortion, the averaged value thereof may be lower than the value that would be obtained when the rectified voltage signal has no distortion. In accordance with the leakage detection breaker of this modification, even in such a case, current leakage can be determined with precision from the energy of the voltage signal.

(Modification)

Figure 10:
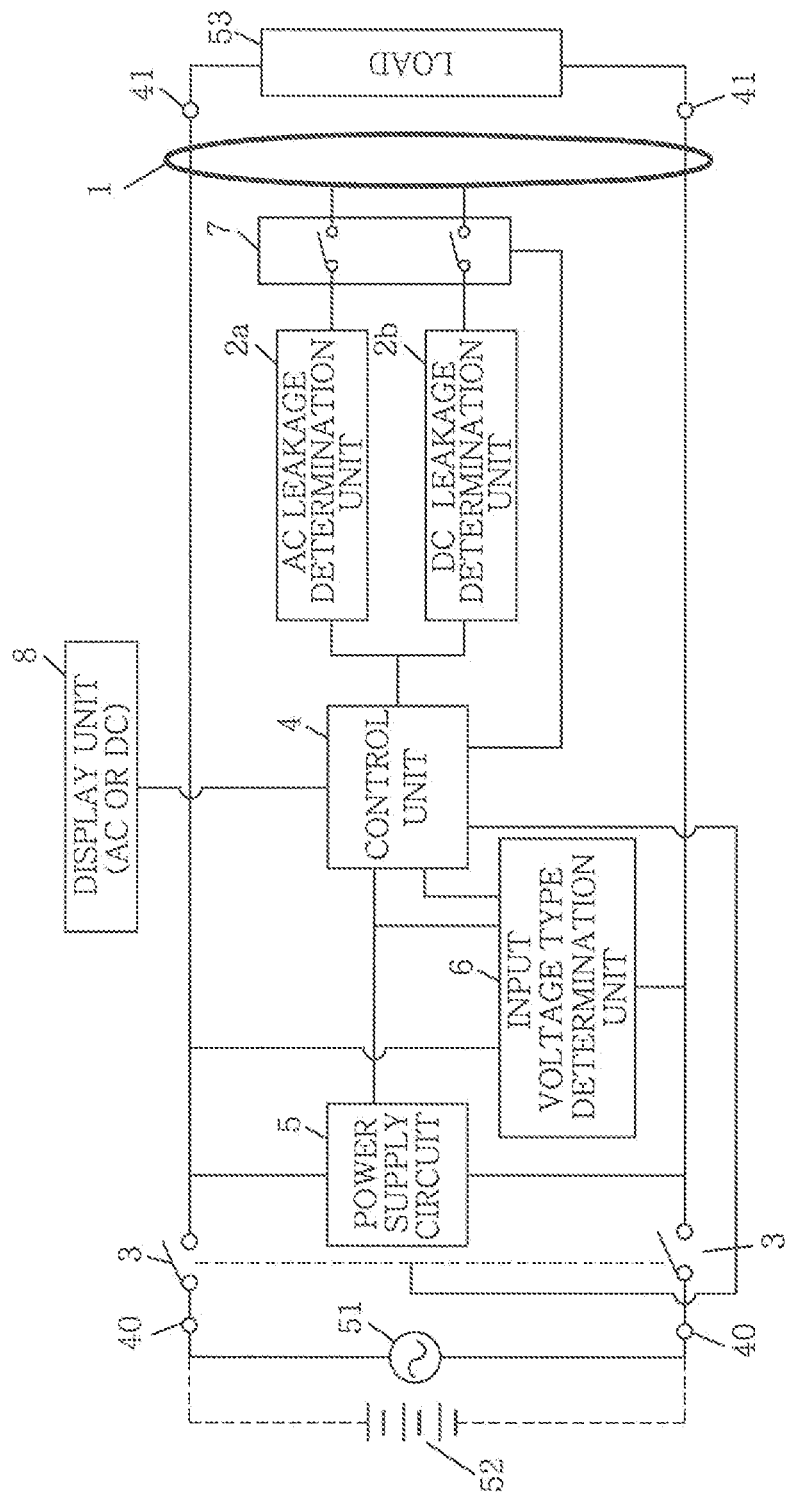
FIG. 10 is a circuit diagram schematically showing the configuration of still another modification of the leakage detection breaker in accordance with the aforementioned embodiment.

FIG. 10 shows still another modification of the leakage detection breaker in accordance with the aforementioned embodiment. In this modification, the leakage detection breaker further includes a display unit 8 as compared with the modification shown in FIG. 7. The display unit 8 displays the input voltage type determined by the input voltage type determination unit 6, for example, by turning on an LED, or the like.

In accordance with the leakage detection breaker of this modification, DC or AC leakage can be identified by checking the display unit 8. Accordingly, when a current leakage occurs, a user and a manager can easily respond to the current leakage.

(Modification)

Figure 11:
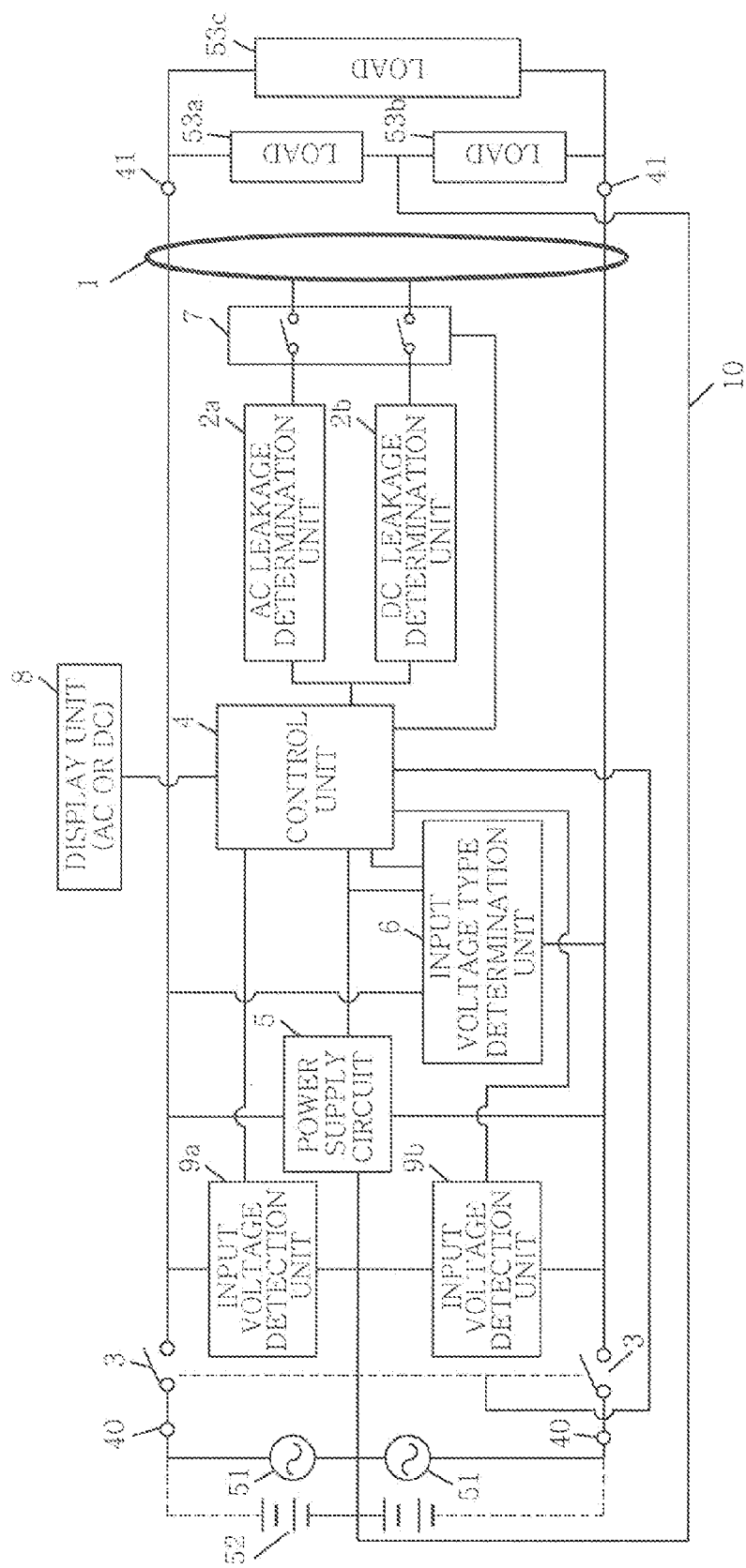
FIG. 11 is a circuit diagram schematically showing the configuration of still another modification of the leakage detection breaker in accordance with the aforementioned embodiment.

FIG. 11 shows still another modification of the leakage detection breaker in accordance with the aforementioned embodiment. In the modification, for a single-phase three-wire power distribution method using a neutral line 10, loads 53a and 53b of 100 V and a load 53c of 200V are connected to the leakage detection breaker. The leakage detection breaker further includes input voltage detection units 9a and 9b as compared with the modification shown in FIG. 10.

In FIG. 11, when the neutral line 10 is moved due to a certain error, a high voltage is applied to either of the load 53a or 53b, and the load may be damaged. Accordingly, in this modification, the input voltage detection unit 9a detects the voltage applied to the load 53a, and the input voltage detection unit 9b detects the voltage applied to the load 53b. Then, if a voltage equal to or higher than a predetermined threshold value is detected by the input voltage detection unit 9a or the input voltage detection unit 9b, the power supply cut-off units 3 cut off the supply of AC power.

In accordance with the leakage detection breaker of this modification with the single-phase three-wire power distribution method using the neutral line 10, the leakage detection breaker may cut off the supply of power to protect the loads when the AC voltage applied to the loads are unbalanced.

(Modification)

Figure 12:
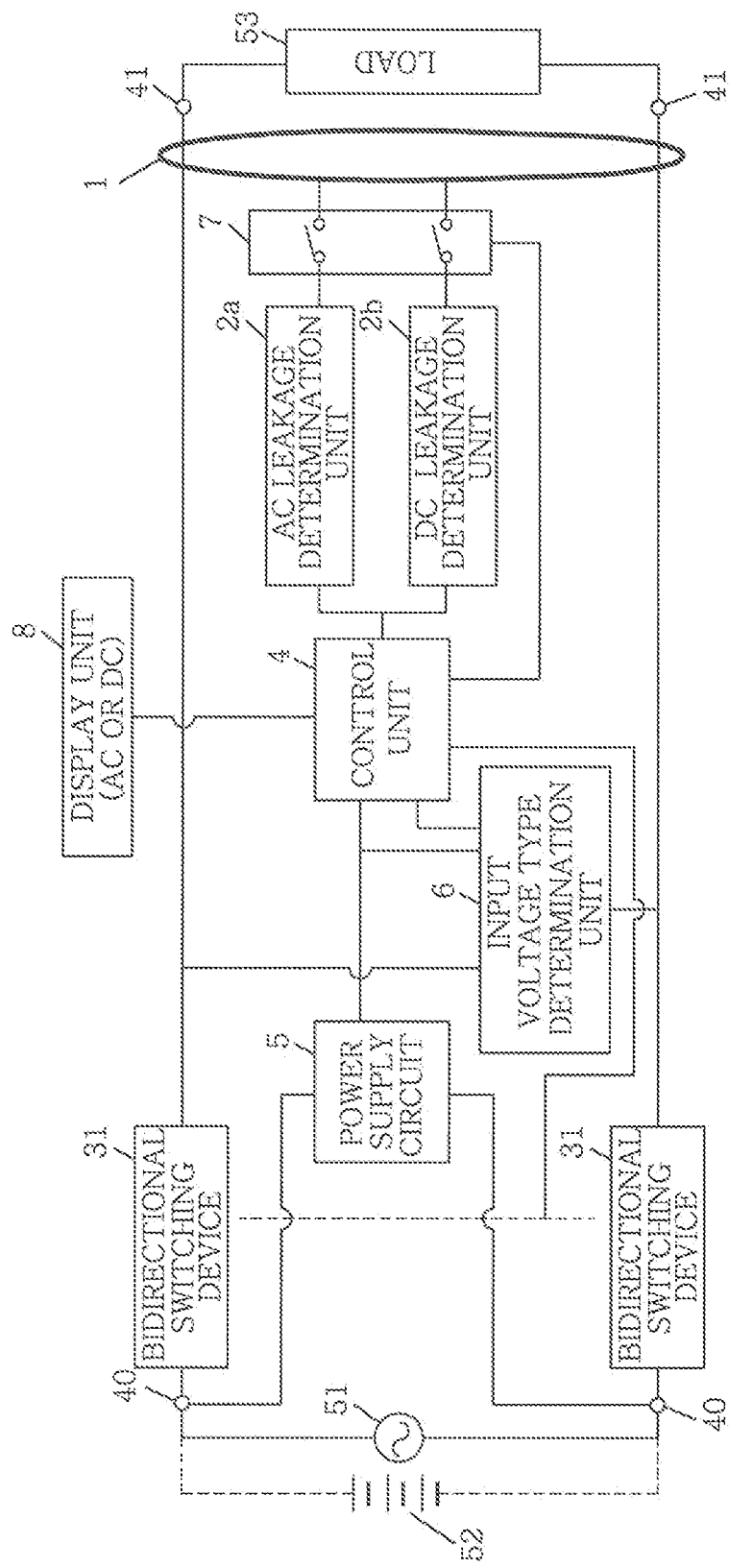
FIG. 12 is a circuit diagram schematically showing the configuration of still another modification of the leakage detection breaker in accordance with the aforementioned embodiment.

FIG. 12 shows still another modification of the leakage detection breaker in accordance with the aforementioned embodiment. In this modification, a bidirectional switching semiconductor device 31 is employed as the power supply cut-off unit 3 in the modification shown in FIG. 10.

If a relay or the like having a mechanical contact is used as the power supply cut-off unit 3, a scale of a circuit thereof may become large due to the configuration required for suppressing the generation of an arc in controlling the cutoff of DC power. In this modification, since the bidirectional switching semiconductor device 31 is employed as the power supply cut-off unit 3, the generation of an arc can be prevented by controlling the cutoff of DC power, and the circuit can be miniaturized.

(Modification)

Figure 13:
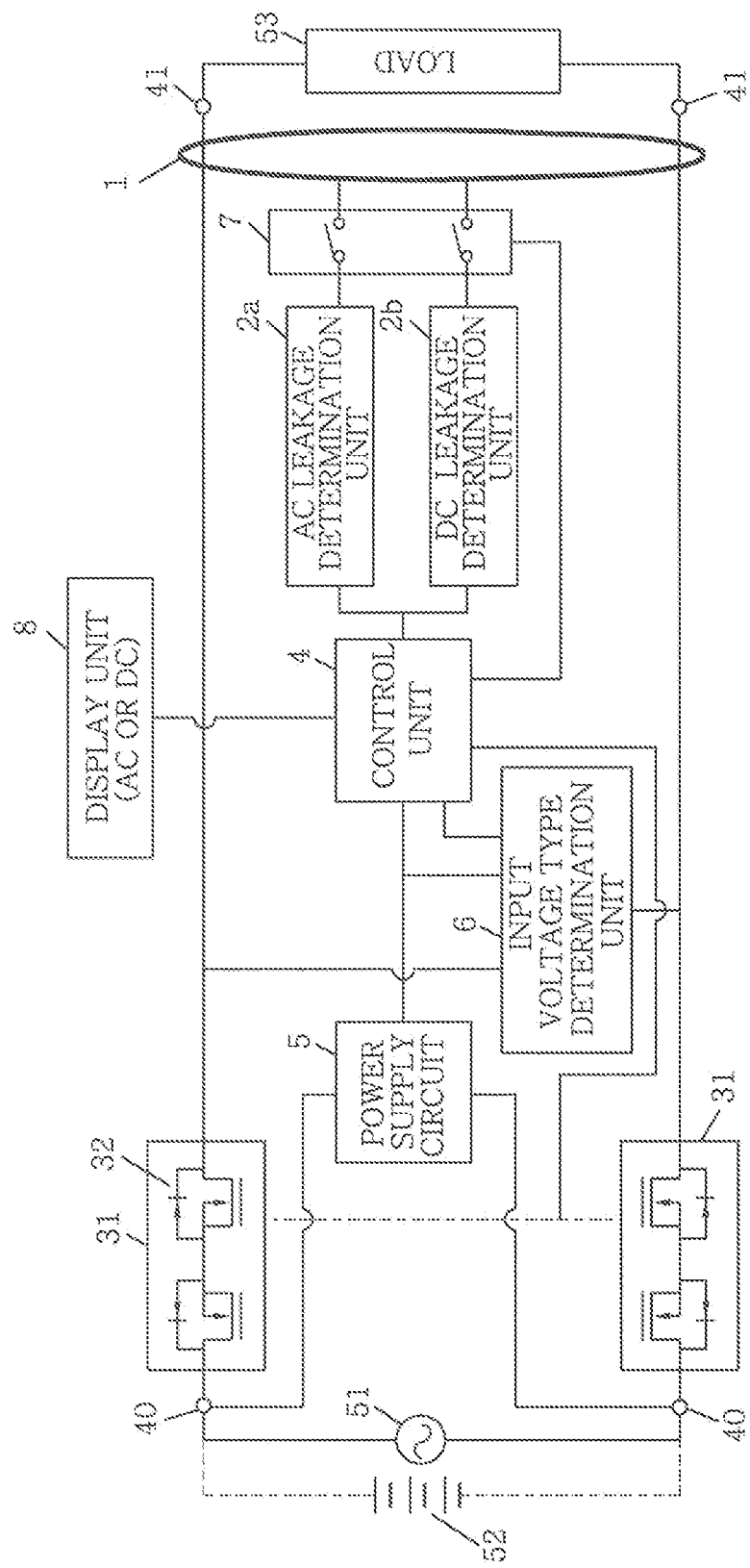
FIG. 13 is a circuit diagram schematically showing the configuration of still another modification of the leakage detection breaker in accordance with the aforementioned embodiment.

FIG. 13 shows still another modification of the leakage detection breaker in accordance with the aforementioned embodiment. In this modification, two reversely connected unidirectional transistors 32 are employed as the bidirectional switching semiconductor device 31 of the modification shown in FIG. 12. In the two reversely connected unidirectional transistors 32, two parasitic diodes of the unidirectional transistors 32 are reversely connected to each other in series.

A configuration using a triac is generally known as an example of an element for opening/closing an AC circuit. The configuration using the triac, however, cannot open/close a DC circuit. In this modification, two reversely connected unidirectional transistors are employed as the bidirectional switching semiconductor device 31, so that a circuit can be opened/closed even when either the commercial AC power supply 51 or the DC power supply 52 is connected.

(Modification)

Figure 14:
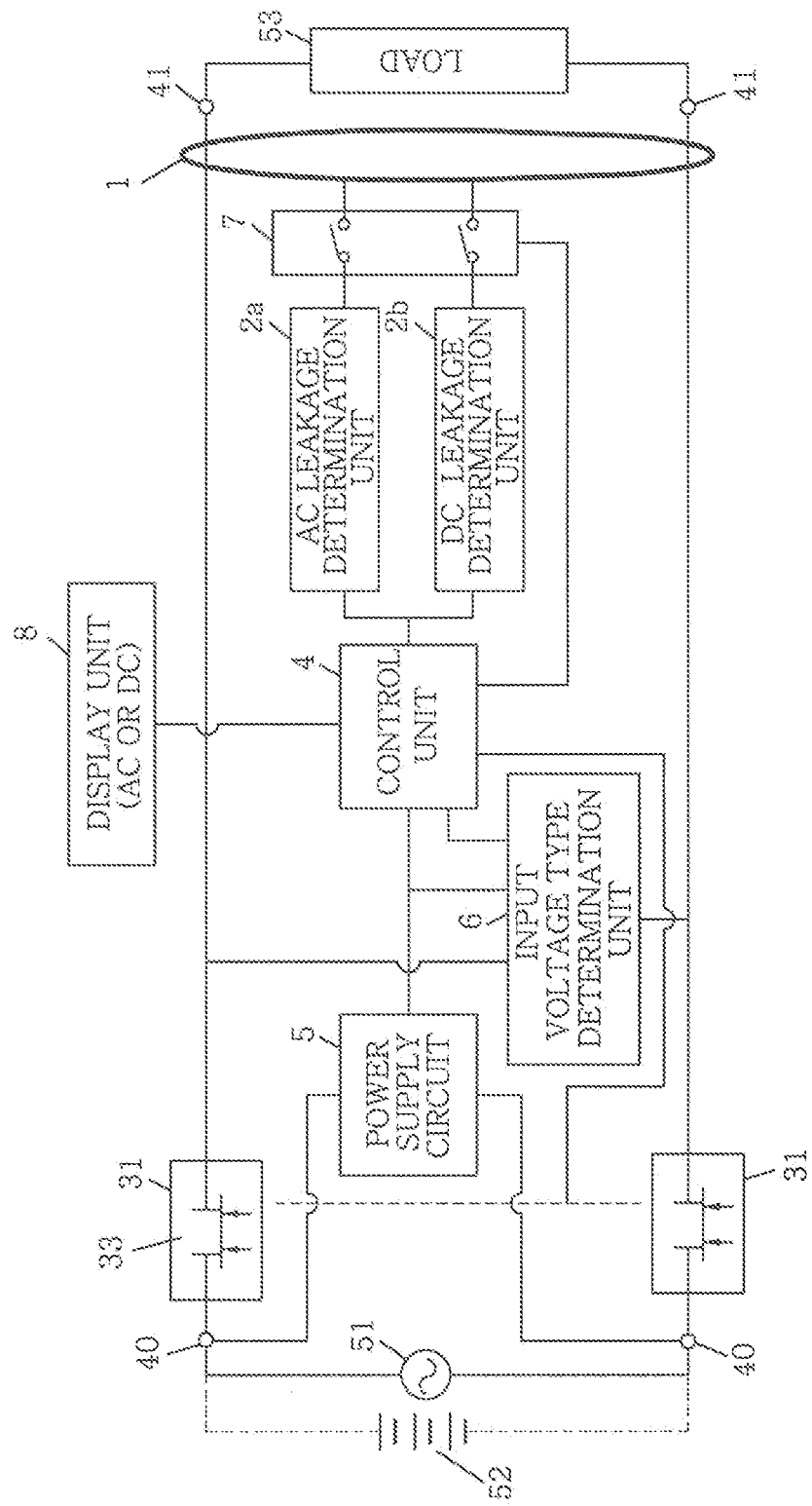
FIG. 14 is a circuit diagram schematically showing the configuration of still another modification of the leakage detection breaker in accordance with the aforementioned embodiment.

FIG. 14 shows still another modification of the leakage detection breaker in accordance with the aforementioned embodiment. In this modification, a lateral bidirectional transistor 33 having two control terminals (dual gate) is employed as the bidirectional switching semiconductor device 31 of the modification shown in FIG. 12.

In accordance with the leakage detection breaker of this modification, miniaturization of the leakage detection breaker as well as the power supply breaker units, can be accomplished while the withstand voltage is maintained between the two control terminals.

(Modification)

Figure 15:
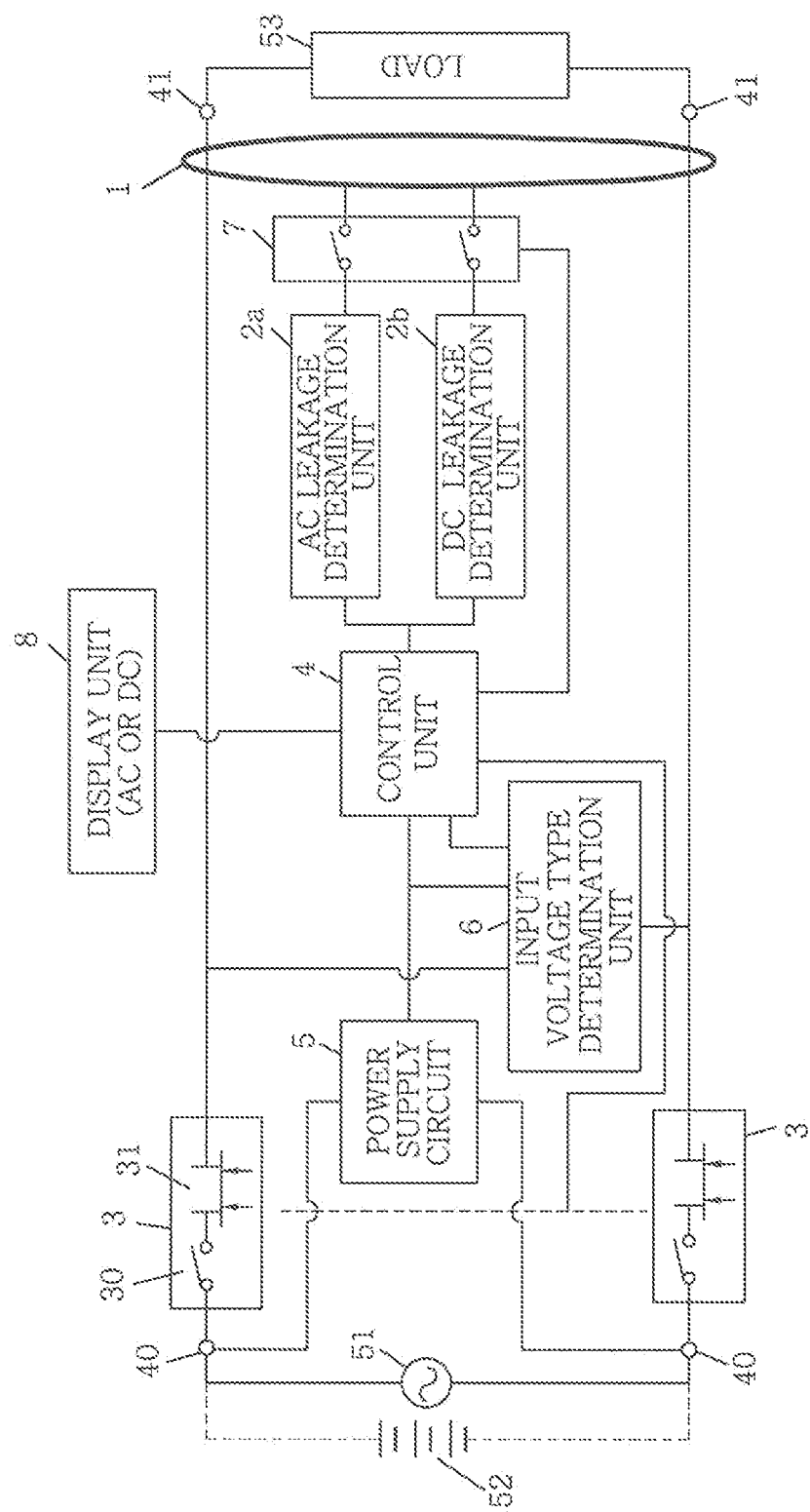
FIG. 15 is a circuit diagram schematically showing the configuration of still another modification of the leakage detection breaker in accordance with the aforementioned embodiment.

FIG. 15 shows still another modification of the leakage detection breaker in accordance with the aforementioned embodiment. In this modification, the power supply cut-off unit 3 of the modification shown in FIG. 10 includes a bidirectional switching semiconductor device and a switching device having a mechanical contact, which are connected in series to each other. A lateral bidirectional transistor 33 is an example of the bidirectional switching semiconductor device, and a mechanical relay 30 is an example of the switching device.

In this modification, when the power supply cut-off unit 3 allows the supply of the power, the mechanical relay 30 is first closed, and then, the bidirectional transistor 33 is closed. On the other hand, when the power supply cut-off unit 3 cuts off the supply of the power, the bidirectional transistor 33 is first opened, and then, the mechanical relay 30 is opened.

In accordance with the leakage detection breaker of this modification, if the mechanical relay 30 and the bidirectional transistor 33 are used together as the power supply cut-off unit 3 and the switching timings are controlled appropriately, the generation of an arc can be suppressed when they are opened and closed thereof. In addition, the insulation of the power supply cut-off unit 3 can be enhanced while the supply of power is cut off.

(Modification)

Figure 16:
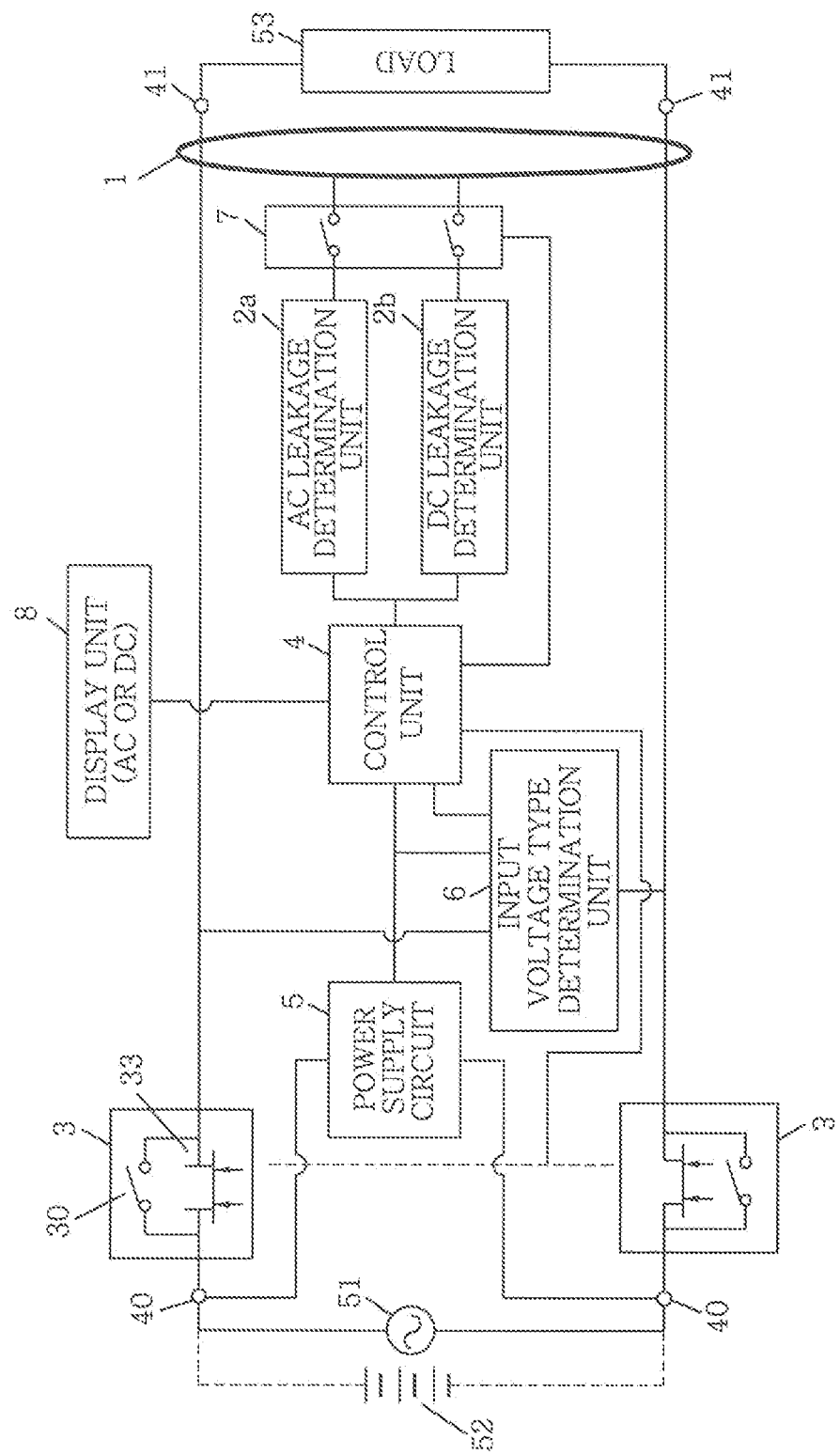
FIG. 16 is a circuit diagram schematically showing the configuration of still another modification of the leakage detection breaker in accordance with the aforementioned embodiment.

FIG. 16 shows still another modification of the leakage detection breaker in accordance with the aforementioned embodiment. In this modification, the power supply cut-off unit 3 of the modification shown in FIG. 10 includes a bidirectional switching semiconductor device and a switching device having a mechanical contact, which are connected in parallel to each other. In this modification, when the power supply cut-off unit 3 allows the supply of the power, the bidirectional transistor 33 is first closed, and then, the mechanical relay 30 is closed. On the other hand, when the power supply cut-off unit 3 cuts off the supply of the power, the mechanical relay 30 is first opened, and then, the bidirectional transistor 33 is opened.

(Switch Device of Lateral Single Gate Transistor Structure)

Figure 17:
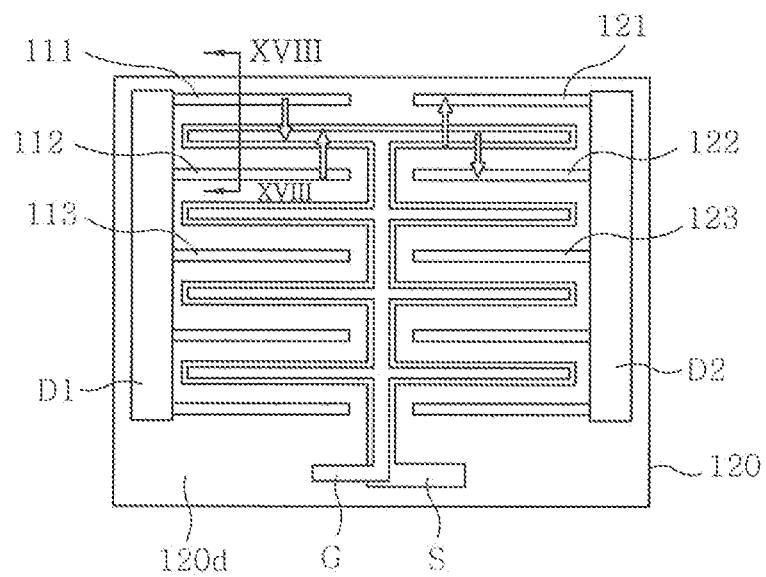
FIG. 17 is a plan view showing the configuration of a switch device of a GaN/AlGaN lateral transistor structure.
Figure 18:
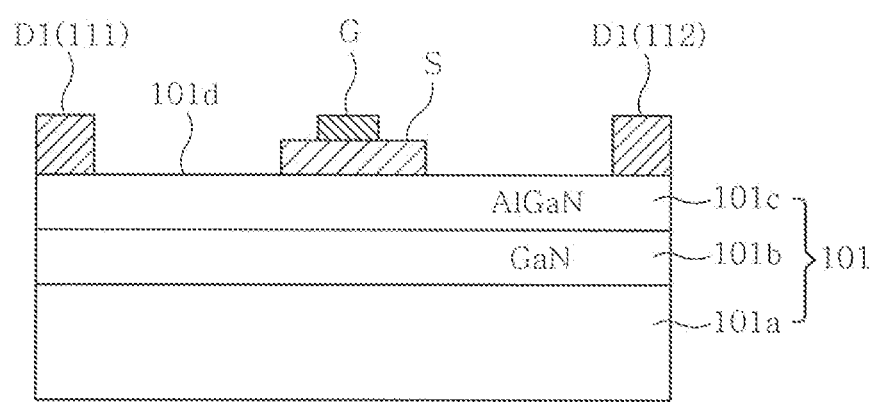
FIG. 18 is a sectional view taken along line XVIII-XVIII in FIG. 17.

FIG. 17 is a plan view showing the configuration of a switch device 101 having a lateral single gate transistor structure that may be used as the bidirectional transistor 33 in FIGS. 14 to 16, and FIG. 18 is a sectional view taken along line XVIII-XVIII in FIG. 17. As shown in FIG. 18, a substrate 120 of the switch device 101 includes a base layer 101a, and a GaN layer 101b and an AlGaN layer 101c which are laminated on the base layer 101a. In the switch device 101, a two-dimensional electron gas layer generated on an AlGaN/GaN heterogeneous interface is used as a channel layer. As shown in FIG. 17, on a surface 120d of the substrate 120, there are formed a first electrode D1 and a second electrode D2 respectively connected to the power supply 51 or 52 or the load 53; and an intermediate potential portion S that has an intermediate potential between the potentials of the first and second electrodes D1 and D2. In addition, a gate electrode G is formed on the intermediate potential portion S. For example, a Schottky electrode is used as the gate electrode G. The first electrode D1 and the second electrode D2 are formed in comb shapes having electrode portions 111, 112, 113 . . . and 121, 122, 123 . . . arranged in parallel with one other, respectively. The comb-shaped electrode portions of the first electrode D1 are arranged opposite to those of the second electrode D2. The intermediate potential portion S and the gate electrode G are arranged between the comb-shaped electrode portions 111, 112, 113 . . . and 121, 122, 123 . . . , to have a shape similar to the plane shape of the space defined between the electrode portions.

As shown in FIG. 17, the electrode portion 111 of the first electrode D1 and the electrode portion 121 of the second electrode D2 are arranged so that their center lines in the widthwise direction are aligned. Also, a corresponding portion of the intermediate potential portion S and a corresponding portion of the gate electrode G are provided in parallel with the electrode portion 111 of the first electrode D1 and the electrode portion 121 of the second electrode D2. The distances from the electrode portion 111 of the first electrode D1 and the electrode portion 121 of the second electrode D2 to the corresponding portion of the intermediate potential portion S and the corresponding portion of the gate electrode G in the width direction are set so that a predetermined withstand voltage can be maintained. The distances in the longitudinal direction of the electrode portion 111 of the first electrode D1 and the electrode portion 121 of the second electrode D2, i.e., in the direction perpendicular to the widthwise direction are also set in the same manner. In addition, such a relationship is similarly applied to the other electrode portions 112 and 122, 113 and 123, . . . . That is, the intermediate potential portion S and the gate electrode G are arranged at positions where the predetermined withstand voltage can be maintained with respect to the first electrode D1 and the second electrode D2.

The intermediate potential portion S, which has an intermediate potential between the potentials of the first electrode D1 and the second electrode D2, and the gate electrode G, which is connected to the intermediate potential portion S and controls the intermediate potential portion S, are arranged at positions where a predetermined withstand voltage can be maintained with respect to the first electrode D1 and the second electrode D2. For this reason, for example, assuming that the first electrode D1 is in a high potential side and the second electrode D2 is in a low potential side, when the switch device 101 is turned off, i.e., a signal of 0 V is applied to the gate electrode G, a current is completely interrupted at least between the first electrode D1 and the gate electrode G, and intermediate potential portion S. That is, the current is blocked immediately below the gate electrode G. Meanwhile, when the switch device 101 is turned on, i.e., when a signal having a voltage of a predetermined threshold value or more is applied to the gate electrode G, a current flows along the path of the first electrode D1, the intermediate potential portion S and the second electrode D2 as shown by arrows in FIG. 17, and vice versa.

Since the intermediate potential portion S is formed at a position where a predetermined withstand voltage can be maintained with respect to the first electrode D1 and the second electrode D2, even if the threshold voltage of the signal applied to the gate electrode G is lowered to a necessary minimum level, the switch device 101 can be surely switched on/off, thereby enabling a low on-resistance of the switch device. In addition, a reference potential of a control signal is set to be the same as the potential of the intermediate potential portion S by configuring the bidirectional transistor 33 using the switch device 101, so that the control unit 4 driven by a control signal of a few voltages may directly control a power supply of high voltage. In addition, in the lateral transistor device using the two-dimensional electron gas layer generated on the heterogeneous interface as a channel layer, a potential of the threshold voltage of the bidirectional transistor 33 is in inverse proportional with the on-resistance in an on-state of the bidirectional transistor 33. For this reason, if the threshold voltage is lowered, then a low on-resistance can be maintained, so that a small-sized high-capacity power supply cut-off unit 3 can be implemented.

(Switch Device of Lateral Dual-Gate Transistor Structure)

Figure 19:
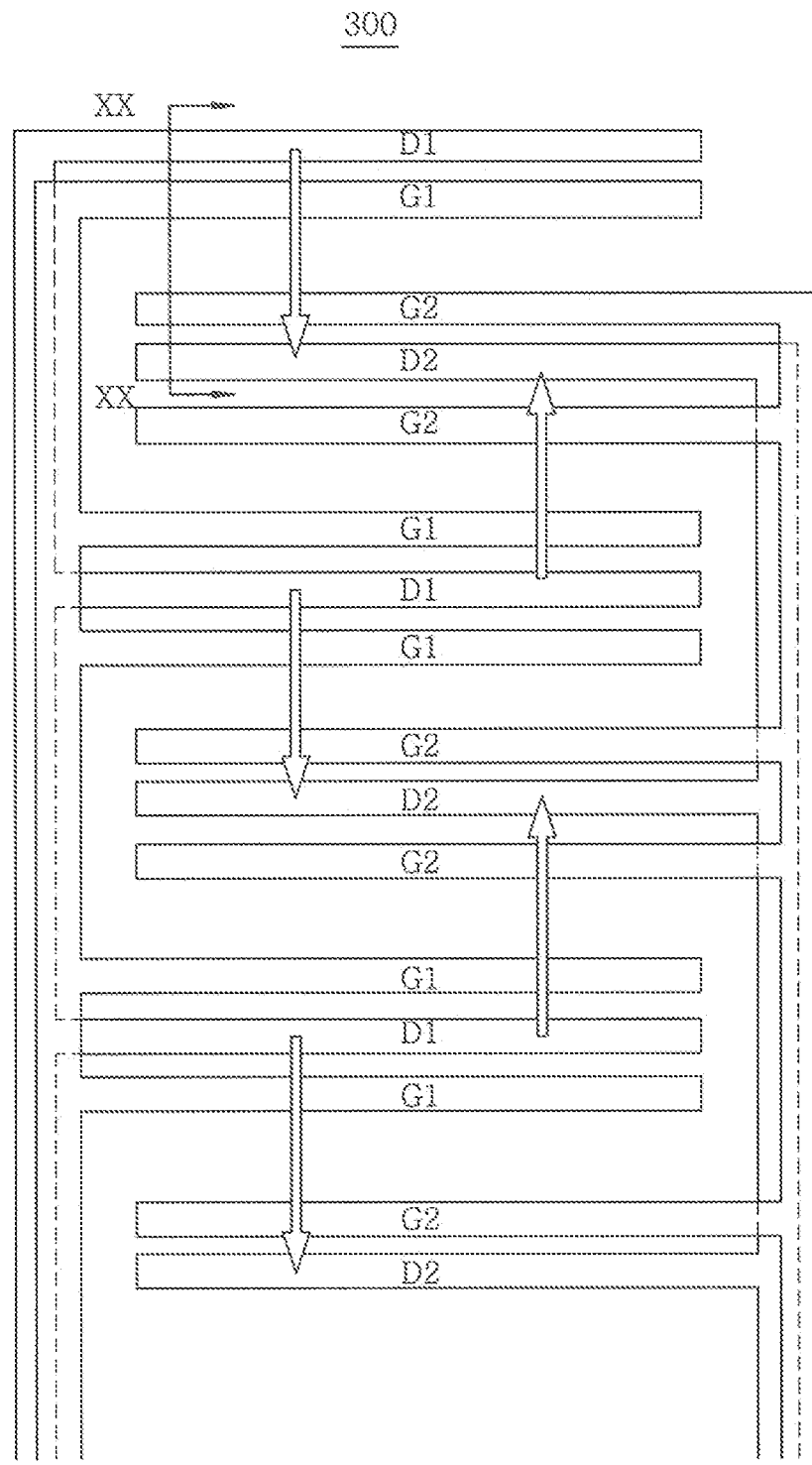
FIG. 19 is a plan view showing the configuration of a bidirectional switch device of a GaN/AlGaN lateral transistor structure.

FIG. 19 is a plan view showing the configuration of a bidirectional switch device 300 having a GaN/AlGaN lateral dual-gate transistor structure, which is a switch device having a transistor structure that can be used as the bidirectional transistor 33 in FIGS. 14 to 16, and FIG. 20 is a sectional view thereof taken along the line XX-XX.

Figure 20:
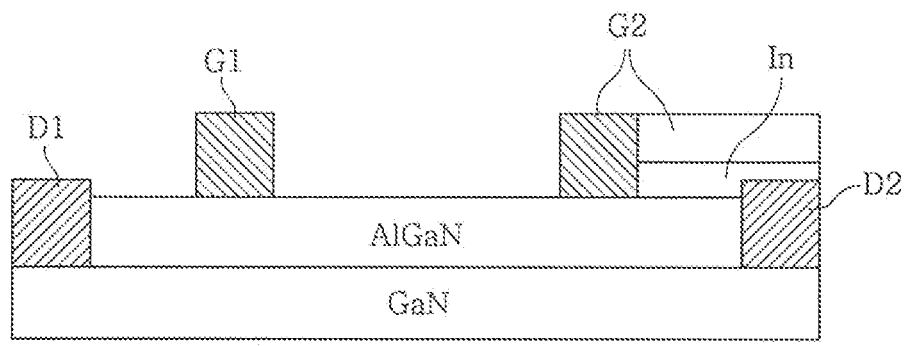
FIG. 20 is a sectional view taken along line XX-XX in FIG. 19.

As shown in FIG. 20, the bidirectional switch device 300 is provided with first and second electrodes D1 and D2 formed on a surface of a substrate, and first and second gate electrodes G1 and G2, at least a portion of each of which is formed on the surface of the substrate, and independent control signals are respectively inputted. In addition, the first gate electrode G1 and the second gate electrode G2 are arranged at positions where a predetermined withstand voltage can be maintained. Since a portion which can maintain the withstand voltage is one point between the first gate electrode G1 and the second gate electrode G2, a bidirectional switch device with a small loss can be implemented. Such a bidirectional switch device 300 needs to be controlled based on the voltage of the drain electrodes D1 and D2, and different driving signals need to be inputted into the two gate electrodes G1 and G2 (for this reason, it is referred to as a dual-gate transistor). The equivalent circuit of the bidirectional switch device 300 is almost the same as two MOSFET transistors of which two parasitic diodes are reversely connected to each other in series as shown in FIG. 13.

In accordance with the leakage detection breaker of this modification, since the mechanical relay 30 and the bidirectional transistor 33 are used together as the power supply cut-off unit 3 and the switching timings thereof are appropriately controlled, the generation of an arc can be suppressed when they are opened/closed. In addition, a high current may flow into the load 53.

In addition, the present invention is not limited to the configuration of the embodiments described above but may include at least the AC leakage current detection unit 1a, the DC leakage current detection unit 1b, the AC leakage determination unit 2a, the DC leakage determination unit 2b, and the power supply cut-off units 3. In addition, the present invention may be configured by appropriately combining the features of the modifications.

Although the preferred embodiments of the present invention have been described, the present invention is not limited thereto. Various changes and modifications may be made within the scope of the following claims, and the changes and modifications will be included in the scope of the present invention.

What is claimed is:

1. A leakage detection breaker provided between a power supply and a load, comprising:
    a current transformer configured to detect a leakage current from a power line connected between the power supply and the load;
    a current leakage determination unit configured to determine DC and AC leakages based on an output signal from the current transformer;
    a power supply cut-off unit configured to cut off a supply of DC or AC power when the current leakage determination unit determines the occurrence of the DC or AC leakage, and
    an input voltage type determination unit configured to determine a type of voltage applied from the power supply to the power line when the power supply is supplying power to the load,
    wherein the leakage determination unit determines whether the DC leakage or the AC leakage occurs depending on the type of voltage determined by the input voltage type determination unit.

2. The leakage detection breaker of claim 1, wherein the current transformer is configured to detect DC and AC leakage currents.

3. The leakage detection breaker of claim 1, wherein the leakage determination unit determines whether the DC leakage or the AC leakage occurs based on a signal obtained by squaring an output signal from the current transformer.

4. The leakage detection breaker of claim 3, further comprising:
    a display unit configured to display the type of voltage determined by the input voltage type determination unit when the current leakage determination unit determines the occurrence of the DC or AC leakage.

5. The leakage detection breaker of claim 1, further comprising:
    a display unit configured to display the type of voltage determined by the input voltage type determination unit when the current leakage determination unit determines the occurrence of the DC or AC leakage.

6. The leakage detection breaker of claim 1, further comprising:
    an input voltage detection unit configured to detect AC input voltage,
    wherein the power supply cut-off unit cuts off the supply of AC power when the input voltage detection unit detects the input voltage equal to or higher than a predetermined voltage.

7. The leakage detection breaker of claim 1, wherein the power supply cut-off unit comprises a bidirectional switching semiconductor device.

8. The leakage detection breaker of claim 7, wherein the bidirectional switching semiconductor device comprises two unidirectional transistors reversely connected to each other in series.

9. The leakage detection breaker of claim 7, wherein the bidirectional switching semiconductor device comprises a lateral bidirectional transistor having two control terminals.

10. The leakage detection breaker of claim 7, wherein the power supply cut-off unit comprises a structure in which a lateral bidirectional transistor having two control terminals and a switching device having a contact are connected in series.

11. The leakage detection breaker of claim 7, wherein the power supply cut-off unit comprises a structure in which a lateral bidirectional transistor having two control terminals and a switching device having a contact are connected in parallel.

* * * * *